US012809746B2

(12) United States Patent
Lee et al.

(10) Patent No.: US 12,809,746 B2
(45) Date of Patent: Nov. 24, 2026

(54) PERFORMANCE ENHANCEMENT METHOD AND DEVICE FOR SOFTWARE DEFECT PREDICTION MODEL

(71) Applicant: INDUSTRIAL COOPERATION FOUNDATION JEONBUK NATIONAL UNIVERSITY, Jeonju-si (KR)

(72) Inventors: Jae Wook Lee, Seoul (KR); Ji Won Choi, Jeonjusi (KR); Duk San Ryu, Jeonju-si (KR); Sun Tae Kim, Jeonju-si (KR)

(73) Assignee: INDUSTRIAL COOPERATION FOUNDATION JEONBUK NATIONAL UNIVERSITY, Jeonju-si (KR)

( * ) Notice: Subject to any disclaimer, the term of this patent is extended or adjusted under 35 U.S.C. 154(b) by 317 days.

(21) Appl. No.: 18/624,155

(22) Filed: Apr. 2, 2024

(65) Prior Publication Data

US 2025/0225055 A1 Jul. 10, 2025

(30) Foreign Application Priority Data

Jan. 8, 2024 (KR) ........................ 10-2024-0002965

(51) Int. Cl.
*G06F 11/3604* (2025.01)

(52) U.S. Cl.
CPC ................................ *G06F 11/3608* (2013.01)

(58) Field of Classification Search
CPC ................................................... G06F 11/3608
See application file for complete search history.

(56) References Cited

U.S. PATENT DOCUMENTS 10,331,542 B2 * 6/2019 Iyer ..................... G06F 11/3636
10,489,587 B1 * 11/2019 Kennedy ................ G06N 5/045
10,740,216 B1 * 8/2020 Parent .................. G06F 11/362
10,838,849 B2 * 11/2020 Kochura ............... G06F 40/279
11,971,802 B2 * 4/2024 Ni ......................... G06F 11/079
(Continued)

FOREIGN PATENT DOCUMENTS

KR 100987124 B1 10/2010
KR 20110025171 A 3/2011
(Continued)

OTHER PUBLICATIONS

Gao et al., "Harmony Search Method: Theory and Applications", 2015, Hindawi Publishing Corporation (Year: 2015).*
(Continued)

*Primary Examiner* — Douglas M Slachta
(74) *Attorney, Agent, or Firm* — NKL Law; Jae Youn Kim

(57) ABSTRACT

A performance enhancement method for a software defect prediction model according to one embodiment includes a software defect prediction model providing step of providing the software defect prediction model that identifies a module in which a software defect occurs, and a parameter optimization step of simultaneously optimizing at least one parameter in each step of a software defect prediction process by using an optimization algorithm to enhance performance of the software defect prediction model and in which a preprocessing step and a classification model generation step are simultaneously performed for a search space of the optimization algorithm.

6 Claims, 8 Drawing Sheets

(56) References Cited

U.S. PATENT DOCUMENTS

| | | | | |
|---|---|---|---|---|
| 2019/0317879 | A1* | 10/2019 | Mccormick | G06F 11/3608 |
| 2020/0150951 | A1* | 5/2020 | Kimball | G06F 8/72 |
| 2020/0241861 | A1* | 7/2020 | Zhang | G06F 11/079 |
| 2021/0089285 | A1* | 3/2021 | Du | G06F 8/447 |

FOREIGN PATENT DOCUMENTS

| | | | |
|---|---|---|---|
| KR | 101110021 | B1 | 2/2012 |
| KR | 20130118335 | A | 10/2013 |
| KR | 20190118937 | A | 10/2019 |
| KR | 20220059120 | A | 5/2022 |
| KR | 20220090360 | A | 6/2022 |
| KR | 20220155834 | A | 11/2022 |
| KR | 20230120859 | A | 8/2023 |
| KR | 20230124336 | A | 8/2023 |

OTHER PUBLICATIONS

Jaewook Lee et al. "Holistic Parameter Optimization for Software Defect Prediction", IEEE Access, vol. 10 2022, date of publication Oct. 4, 2022, pp. 106781-106797.

* cited by examiner

400

Algorithm 1 HS-CSDT

Input:

DATA: software defect prediction data
M: the number of repetitions
K: the number of folds

Output:

report average *PD*, *PF*, *G-Measure* and *FIR* values

Begin

```
For each data ∈ DATA do
    For each time ∈ [1, M] do /*M times stratified K-fold cross-validation*/
        For each fold ∈ [1, K] do
            X_train, X_test ←DATA [fold];
            h_i ←generate best harmony from harmony search algorithm;
            v_n ← normalization parameter in h_i;
            v_f ← feature selection parameter in h_i;
            v_w ← class weight in h_i;
            v_h ← decision tree hyper-parameter in h_i;
            X_train ← normalization (v_n);
            X_train ← feature selection (v_f);
            Decision tree (v_w, v_h) ← Train (X_train); /*train a base learner decision tree*/
            Compute PD (fold), PF (fold), G-measure(fold), FIR (fold) by X_test
        End for
    End for
End for
```

End

FIG. 4

700

| Measure | HS-CSDT Vs. | | | | | | |
| --- | --- | --- | --- | --- | --- | --- | --- |
| | HSOCS-US-SVM (710) | SOGA-LR (720) | SOGA-DT (730) | COSTE-MLP (740) | DT (750) | LR (760) | SVM (770) |
| *PD* | 0.656(M) | 0.653(M) | 0.323(S) | 1.8448(L) | 3.09(L) | 2.96(L) | 2.991(L) |
| *PF* | -0.765(L) | -1.1298(L) | -0.8828(L) | -0.1265(N) | -0.3596(S) | -1.2166(L) | -1.008(L) |
| *G-Measure* | 1.211(L) | 1.379(L) | 0.947(L) | 1.9629(L) | 3.126(L) | 2.837(L) | 3.349(L) |
| *FIR* | 0.556(M) | 0.512(M) | 0.379(S) | 0.3327(S) | 1.105(L) | 1.113(L) | 1.28(L) |

FIG. 7

PERFORMANCE ENHANCEMENT METHOD AND DEVICE FOR SOFTWARE DEFECT PREDICTION MODEL

BACKGROUND OF DISCLOSURE

The present invention relates to a software defect prediction (SDP) field, and more particularly, to a performance enhancement method and device for a software defect prediction model.

Software quality assurance (QA) is one of important topics in software engineering. Software defect prediction (SDP) is a technique used to ensure software quality.

A software defect prediction model identifies a module in which defects may easily occur. Setting appropriate parameters in the software defect prediction model is very important due to influence on model performance. The software defect prediction aims to identify the largest possible defective module in a software system prior to testing. Also, the software defect prediction assists allocating limited human and material resources effectively in software projects.

For the software defect prediction, previous studies have applied various machine learning models to identify software modules in which defects may easily occur.

The machine learning models have a variety of configurable parameters that have to be set based on a developer's experience. For example, a kernel type is designated to a support vector machine (SVM) model, before training.

Similarly, a K value of the K-nearest neighbor model is designated before training. However, when learning with non-optimal parameters, prediction model performance is significantly reduced. Accordingly, it is very important to adjust and optimize model parameters to obtain significant performance enhancement.

In order to solve the conventional problems, the present invention provides a performance enhancement method and device for a software defect prediction model that pursues substantial performance enhancement in software defect prediction by simultaneously optimizing parameters not only in a preprocessing step of software defect prediction but also in a classification model construction step thereof.

Objects of the present invention are not limited to the objects described above, and other objects not described may be clearly understood from following descriptions.

SUMMARY OF DISCLOSURE

A performance enhancement method, performed by one or more processors, for a software defect prediction model according to one embodiment includes a software defect prediction model providing step of providing the software defect prediction model that identifies a module in which a software defect occurs, and a parameter optimization step of simultaneously optimizing at least one parameter in a software defect prediction process by using an optimization algorithm to enhance performance of the software defect prediction model, in which a preprocessing step and a classification model generation step are simultaneously performed for a search space of the optimization algorithm.

Preferably, it is characterized in that the optimization algorithm uses a cost-sensitive decision tree based on harmony search (HS-CSDT), and the cost-sensitive decision tree based on harmony search uses a harmony search algorithm (HS) that is a metaheuristic algorithm.

Preferably, it is characterized in that the preprocessing step includes normalization, feature selection, and class imbalance learning, and the classification model generation step includes a decision tree (DT) model.

Preferably, it is characterized in that the parameter optimization step includes a parameter extraction step of extracting parameters in the normalization, the feature selection, and the class imbalance learning and hyperparameters of the decision tree model by executing the cost-sensitive decision tree based on harmony search with training data, and a performance evaluation step of evaluating performance of the software defect prediction model by using the extracted parameters in the normalization, the feature selection, and the class imbalance learning, and the extracted hyperparameters of the decision tree model.

Preferably, it is characterized in that the evaluation of the performance of the software defect prediction model is performed by calculating probability of detection, probability of false alarm, a geometric mean (G-measure), and file inspection reduction (FIR) by using validation data and by calculating an average value of the calculated probability of detection, probability of false alarm, G-measure, and FIR. The G-measure in this application refers to the geometric mean.

Preferably, the parameter optimization step includes adjusting the parameters in the normalization, the feature selection, and the class imbalance learning and the hyperparameters of the decision tree model to increase the G-measure.

According to another embodiment, a performance enhancement device for a software defect prediction model includes a software defect prediction model providing unit that provides the software defect prediction model for identifying a module in which a software defect occurs, and a parameter optimization unit that simultaneously optimizes at least one parameter in each step of a software defect prediction process by using an optimization algorithm to enhance performance of the software defect prediction model and in which a preprocessing step and a classification model generation step are simultaneously considered for a search space of the optimization algorithm.

Preferably, it is characterized in that the optimization algorithm uses a cost-sensitive decision tree based on harmony search (HS-CSDT), and the cost-sensitive decision tree based on the harmony search uses a harmony search algorithm (HS) that is a metaheuristic algorithm.

Preferably, it is characterized in that the preprocessing step includes normalization, feature selection, and class imbalance learning, and the classification model generation step includes a decision tree (DT) model.

Preferably, the parameter optimization unit includes a parameter extraction unit that extracts parameters in the normalization, the feature selection, and the class imbalance learning and hyperparameters of the decision tree model by executing the cost-sensitive decision tree based on harmony search with training data, and a performance evaluation unit that evaluates performance of the software defect prediction model by using the extracted parameters in the normalization, the feature selection, and the class imbalance learning, and the extracted hyperparameters of the decision tree model.

Preferably, it is characterized in that the evaluation of the performance of the software defect prediction model by the performance evaluation unit is performed by calculating probability of detection, probability of false alarm, G-measure, and file inspection reduction (FIR) by using validation data and by calculating an average value of the calculated probability of detection, probability of false alarm, G-measure, and FIR.

Preferably, the parameter optimization unit includes adjusting the parameters in the normalization, the feature selection, and the class imbalance learning and the hyperparameters of the decision tree model to increase the G-measure.

Specific details of other embodiments are included in the detailed description and drawings.

A performance enhancement method and device for a software defect prediction model according to the present invention has an advantage of achieving substantial performance enhancement by simultaneously optimizing parameters in all process steps of software defect prediction.

According to the performance enhancement method and device for a software defect prediction model of the present invention, an optimal parameter set is automatically assigned at all steps of a software project, and accordingly, excellent defect prediction performance is obtained.

However, effects of the present invention are not limited to the effects described above, and other effects not described may be clearly understood from following descriptions.

BRIEF DESCRIPTION OF DRAWINGS

FIG. 4 is a diagram summarizing an algorithm of cost-sensitive decision tree based on harmony search (HS-CSDT) according to an embodiment of the present invention.

FIG. 7 is a diagram summarizing a statistical analysis result between a cost-sensitive decision tree based on harmony search (HS-CSDT) algorithm and another comparison method in software defect prediction, according to an embodiment of the present invention.

DETAILED DESCRIPTION OF DISCLOSURE

Figure 1:
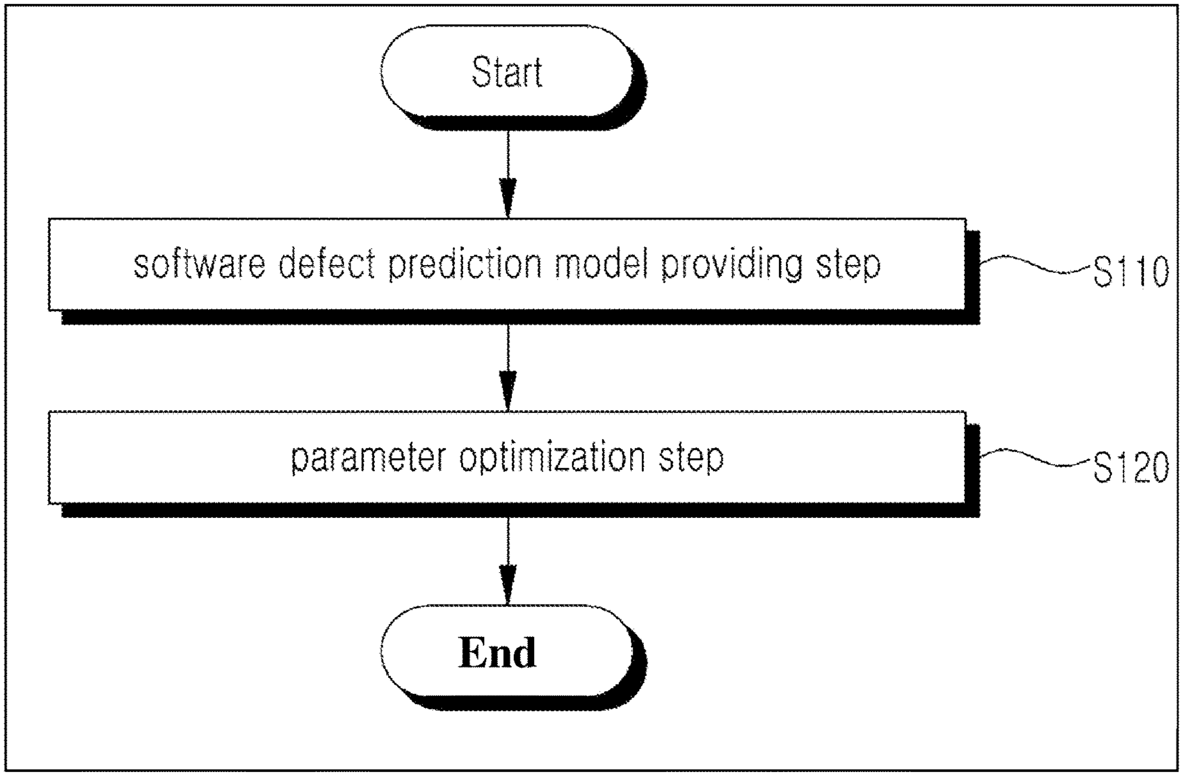
FIG. 1 is a flowchart of a performance enhancement method for a software defect prediction model, according to an embodiment of the present invention.

It is characterized in that a performance enhancement method for a software defect prediction model according to an embodiment of the present invention includes a software defect prediction model providing step of providing the software defect prediction model that identifies a module in which a software defect occurs, and a parameter optimization step of simultaneously optimizing at least one parameter in each step of a software defect prediction process by using an optimization algorithm to enhance performance of the software defect prediction model and in which a preprocessing step and a classification model generation step are simultaneously considered for a search space of the optimization algorithm.

It is characterized in that a performance enhancement device for a software defect prediction model according to an embodiment of the present invention includes a software defect prediction model providing unit that provides the software defect prediction model for identifying a module in which a software defect occurs, and a parameter optimization unit that simultaneously optimizes at least one parameter in each step of a software defect prediction process by using an optimization algorithm to enhance performance of the software defect prediction model and in which a preprocessing step and a classification model generation step are simultaneously considered for a search space of the optimization algorithm.

The advantages and features of the present invention and methods for achieving the advantages and features will become clear by referring to embodiments to be described in detail below along with the accompanying drawings. However, the present invention is not limited to the embodiments disclosed below and may be implemented in various different forms, and the present embodiments are merely provided to ensure that the disclosure of the present invention is complete and to be understood by those skilled in the art, and the present invention is defined only by the scope of the claims. Like reference numerals refer to like elements throughout the specification.

The present embodiments are described herein with reference to cross-sectional views and/or plan views, which are ideal illustrations of the present invention. In the drawings, thicknesses of the components are exaggerated for effective description of the technical content. Accordingly, the configurations illustrated in the drawings have schematic properties, and the shapes of the configurations illustrated in the drawings are intended to illustrate specific forms of the configurations and are not intended to limit the scope of the invention. In various embodiments of the present specification, terms, such as first, second, and third, are used to describe various components, but the components should not be limited by the terms. The terms are merely used to distinguish one component from another. Embodiments described and illustrated herein also include complementary embodiments thereof.

The terminology used herein is for describing embodiments and is not intended to limit the present invention. Herein, singular forms also include plural forms, unless specifically stated otherwise in the context. As used in the specification, "include (comprise)" and/or "including (comprising)" do not exclude the presence or addition of one or more other components, steps, operations, and/or elements to the described elements, steps, operations, and/or elements.

Unless otherwise defined, all terms (including technical and scientific terms) used in the present specification may be used with meanings that may be commonly understood by those skilled in the art to which the present invention pertains. Also, terms defined in commonly used dictionaries are not interpreted ideally or excessively unless clearly specifically defined.

Hereinafter, concept of the present invention and embodiments thereof will be described in detail with reference to the drawings.

FIG. 1 is a flowchart of a performance enhancement method for a software defect prediction model, according to an embodiment of the present invention.

The performance enhancement method for the software defect prediction model according to the embodiment of the present invention includes a software defect prediction model providing step S110 and a parameter optimization step S120.

The software defect prediction model providing step S110 provides a software defect prediction model that identifies a module in which a software defect may occur.

In the parameter optimization step S120, at least one parameter is simultaneously optimized in each step of a software defect prediction process by using an optimization algorithm to enhance the performance of the software defect prediction model.

In the parameter optimization step S120, a search space of an optimization algorithm simultaneously considers a preprocessing step and a classification model construction step.

The software defect prediction model of the present invention is characterized in that model performance is enhanced by simultaneously considering parameters in both the preprocessing step and the classification model construction step.

The optimization algorithm in the present invention uses a cost-sensitive decision tree based on harmony search (HS-CSDT). The cost-sensitive decision tree based on harmony search uses a harmony search algorithm (HS) that is a metaheuristic algorithm. The cost-sensitive decision tree based on harmony search (HS-CSDT) simultaneously identifies optimal feature selection, a regularization technique, a class weight, and a decision tree hyperparameter by using the harmony search algorithm.

In one embodiment, the preprocessing step includes normalization, feature selection, and class imbalance learning, and the classification model construction step includes a decision tree (DT) model.

Feature selection selects a subset of features that may effectively characterize given data (input data). In the present invention, the input data is generated by using software metrics. The metrics include information, such as an LOC (line of code) and an RFC (response for a class).

The normalization is a technique that adjusts a value of each feature within a designated range such that multiple features have the same weight. Defect prediction performance may change depending on used normalization techniques, that is, z-score or min-max.

Class imbalance learning is a factor that affects defect prediction performance, which means that solving this problem may enhance performance. Therefore, in the class imbalance learning, a weight (or ratio) of a defective class and a non-defective class is one of important parameters in the preprocessing step. Software defect data has a class imbalance problem where the number of non-defective instances is greater than the number of defective instances. In most machine learning, when a ratio between instances of a specific class is lopsided, defect prediction performance is negatively affected.

The present invention uses cost-sensitive learning. The cost-sensitive learning solves the class imbalance problem at an algorithmic level. In software QA activities, misclassifying a defective instance is more costly than misclassifying a non-defective instance. Accordingly, a cost-sensitive learning method aims to construct a prediction model with the lowest misclassification cost.

In one embodiment, the parameter optimization step includes a parameter extraction step of extracting parameters in normalization, feature selection, and class imbalance learning and hyperparameters of a decision tree model by executing a cost-sensitive decision tree based on harmony search with training data, and a performance evaluation step of evaluating the performance of a software defect prediction model by using the extracted parameters in the normalization, feature selection, and class imbalance learning and the extracted hyperparameters of the decision tree model.

In the machine learning, hyperparameters are variables set in a model to implement an optimal training model and may determine a learning rate, the number of epochs (number of training repetitions), weight initialization, and so on. Also, optimal values of a training model may be found by applying a hyperparameter tuning technique.

In one embodiment, it is characterized in that the performance of a software defect prediction model is performed by calculating probability of detection, probability of false alarm, a G-measurement value (G-measure), and a code inspection effort rate (FIR) by using validation data and by calculating an average value by averaging the calculated results. The G-measurement value in this application refers to the geometric mean.

Prediction performance for binary classification is generally evaluated by using a confusion matrix in Table 1. In particular, software defect prediction aims to increase a probability of detection (PD) and reduce a probability of false alarm (PF). In the present invention, performance is checked by using a total of four evaluation scales below.

The confusion matrix for a classification result of the software defect prediction model is illustrated in Table 1.

TABLE 1

Confusion Matrix

| | | Predicted class | |
|---|---|---|---|
| | | Defective | Clean |
| Actual Class | Defective | TP(True Positive) | FN(False Negative) |
| | Clean | FP(False Positive) | TN(True Negative) |

_Probability of Detection (PD)

The probability of detection (PD) is an indicator that a model predicts a defect among actual defects and is calculated by Equation (1).

$$PD=TP/(TP+FN) \quad \text{Equation (1)}$$

_Probability of False Alarm (PF)

The probability of false alarm defect misreport rate represents a ratio of the number of non-defects incorrectly classified as defects to the total number of non-defects and is calculated by Equation (2).

$$PF=FP/(FP+TN) \quad \text{Equation (2)}$$

_G-Measurement Value (G-Measure)

The G-measurement value is calculated as a harmonic average of the probability of detection (PD) and the probability of false alarm (PF), is a suitable indicator for evaluating a class imbalance data set, and is calculated by Equation (3).

$$G\text{-measure}=2\times[\{PD\times(1-pf)\}/\{PD+(1-pf)\}] \quad \text{Equation (3)}$$

_File Inspection Reduction (FIR)

The file inspection reduction (FIR) is an indicator of the degree to which a software defect prediction model reduces file inspection. The evaluation indicator is a rate at which the number of files to be inspected is reduced to achieve the same probability of detection (PD). The file inspection reduction (FIR) indicates that the higher the performance, the more the small file easily detects defects. In a file inspection reduction (FIR) equation, file inspection (FI) is a ratio of the number of files to be inspected to the total files. The file inspection reduction (FIR) is calculated by Equation (4).

$$FIR=(PD-FI)/PD \quad \text{Equation (4)}$$

In one embodiment, the parameter optimization step includes adjusting parameters in normalization, feature selection, and class imbalance learning and hyperparameters of a decision tree model to increase the G-measurement value (G-measure). A purpose of the parameter optimization step is to enhance the performance of a software defect prediction model by adaptively adjusting parameters according to a dataset input to the software defect prediction model.

Figure 2:
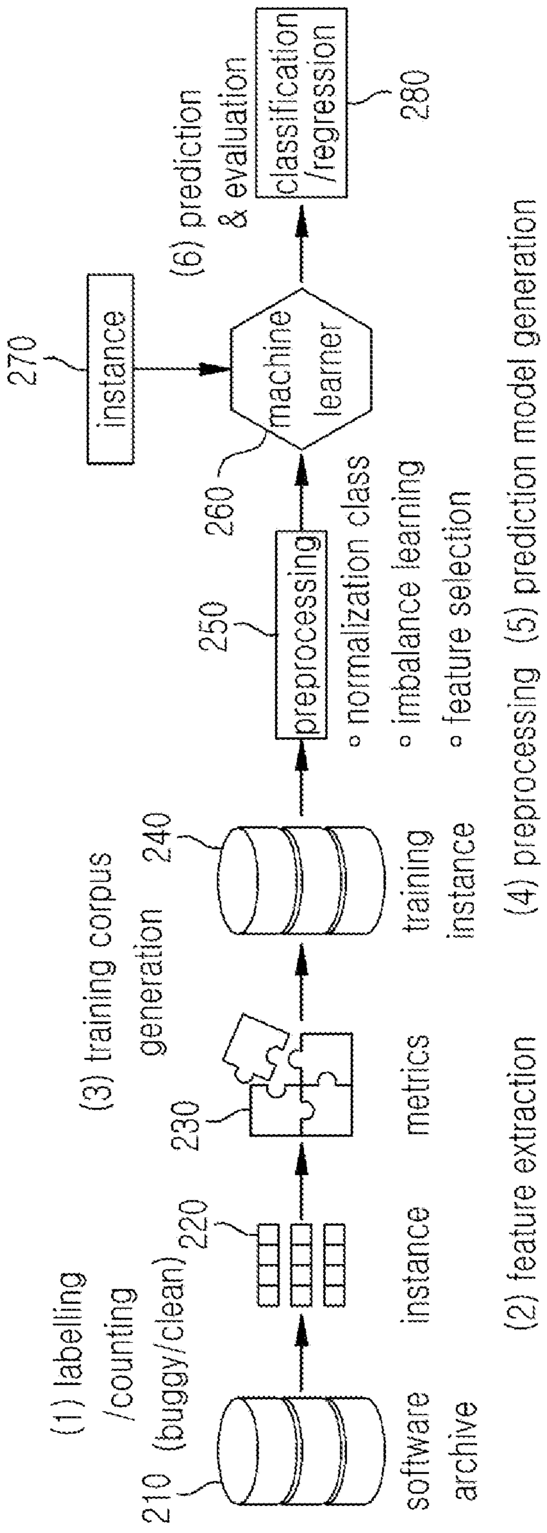
FIG. 2 is a diagram illustrating the entire process of software defect prediction according to an embodiment of the present invention.

FIG. 2 is a diagram illustrating the entire process of software defect prediction, according to an embodiment of the present invention.

FIG. 2 illustrates a general file-level defect prediction process.

In the first step ((1) labeling/counting), files (instances) are collected from a software archive. A software archive 210 includes a version control system, a bug tracking system, and an email archive. Then, when an instance has one or more defects, a label called 'buggy' is designated, and otherwise, a label called 'clean' is designated.

In the second step ((2) feature extraction), software metrics including object-oriented metrics 230 are extracted from an instance 220 and made into features. Such a measurement item may be extracted by using a CKJM tool.

The third step ((3) training corpus generation) is to generate a training instance 240 used for training a machine learning-based model. The labels and features generated in the previous two steps are later used as training data.

In the fourth step ((4) preprocessing), a defect prediction model is generated. Before the training data is used as input data for a prediction model, a preprocessing method 250 is considered. A software defect prediction model (SDP) research uses a preprocessing method, such as normalization, feature selection, and class imbalance learning.

In the final step ((6) prediction & evaluation), the trained model is used to predict and evaluate whether a new instance 270 has a bug or is clean.

Figure 3:
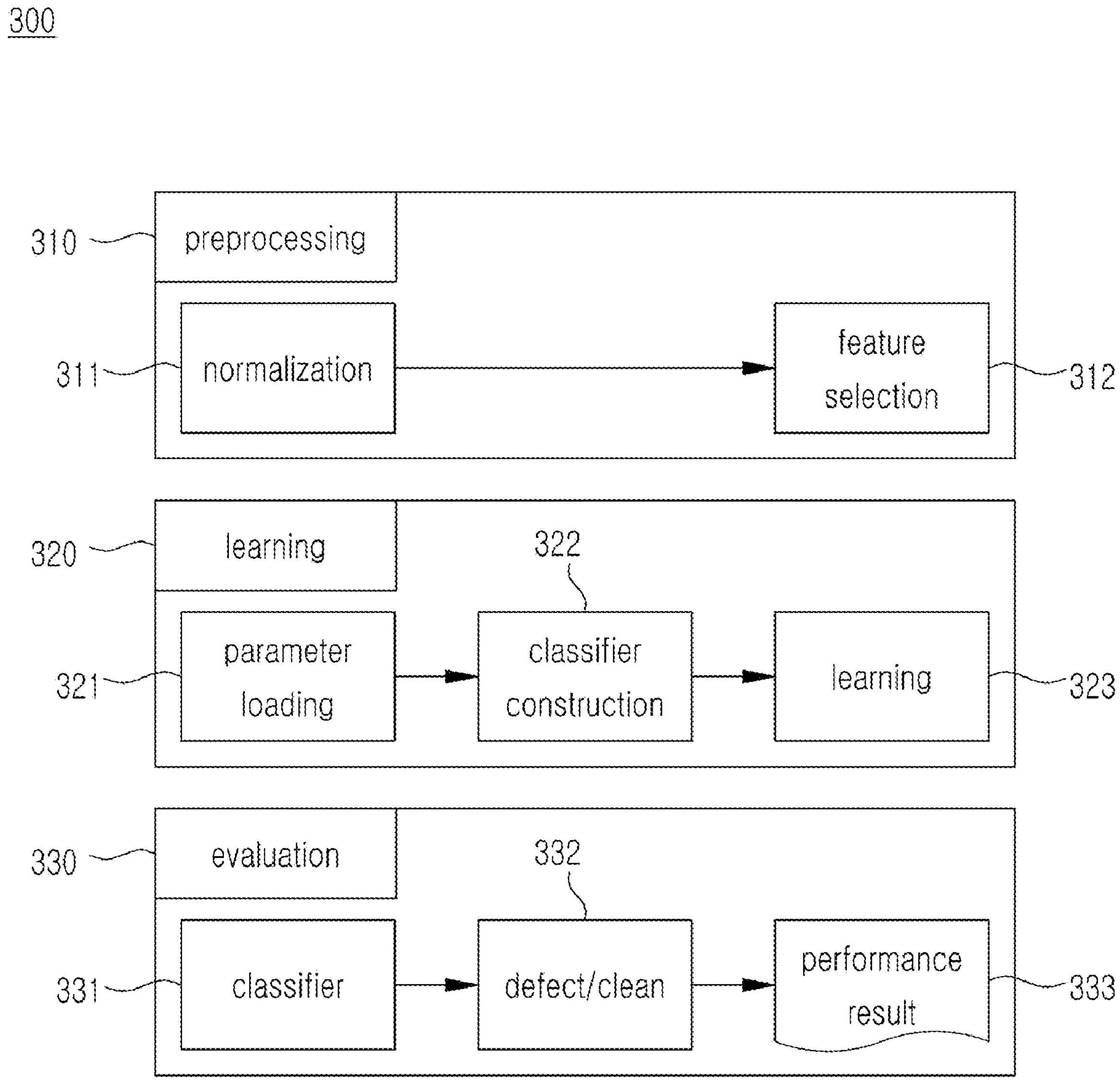
FIG. 3 is a diagram schematically illustrating an execution process of a cost-sensitive decision tree based on harmony search, according to an embodiment of the present invention.

FIG. 3 is a diagram schematically illustrating the execution process of a cost-sensitive decision tree based on Harmony Search according to an embodiment of the present invention.

FIG. 3 schematically illustrates an execution process of the cost-sensitive decision tree based on harmony search and includes a preprocessing step 310, a training step 320, and an evaluation step 330.

The preprocessing step 310 includes normalization 310 of the data input to a software defect prediction model and feature selection 320.

In the present invention, the preprocessing step 310 additionally includes class imbalance learning.

In the training step 320, parameters are loaded (321), a classifier is generated (322), and the generated classifier is trained (323).

A classifier or classification model generation step includes a decision tree (DT) model.

Finally, in the evaluation step 330, a new instance is input to the classifier 331, whether the new instance has a defect is determined (332) (defect/clean), and performance is evaluated.

The evaluation of performance of the software defect prediction model is performed by calculating probability of detection, probability of false alarm, a G-measurement value (G-measure), and file inspection reduction (FIR), and by calculating an average value by averaging the calculated results.

In addition, in order to increase the G-measurement value (G-measure), the parameters in the preprocessing step and the hyperparameters in the classification model generation step are optimized.

FIG. 4 is a diagram summarizing an algorithm of the cost-sensitive decision tree based on harmony search (HS-CSDT), according to an embodiment of the present invention.

The algorithm illustrated in FIG. 4 represents a pseudo-code of the cost-sensitive decision tree based on harmony search (HS-CSDT). Defect prediction data DATA is divided into training data Xtrain and test data Xtest through a layered K-fold validation inspector (first to fourth rows). An optimal parameter set hi having an optimal fitness value is obtained through harmony search (HS), based on the training data.

Hyperparameter optimization is performed by using the harmony search (HS) (fifth line).

A normalization parameter vn, a feature selection parameter vf, a class weight parameter vw, and a model hyperparameter are assigned (sixth to ninth lines).

Next, the model is trained by providing model parameters through a preprocessing process for converting the training data into a feature subset based on the information of each parameter (tenth to twelfth lines).

Then, the trained model is used to predict defects in the test data (thirteenth line). Finally, second to fifteenth lines are repeated to average the performance of the cost-sensitive decision tree based on harmony search (HS-CSDT).

Figure 5:
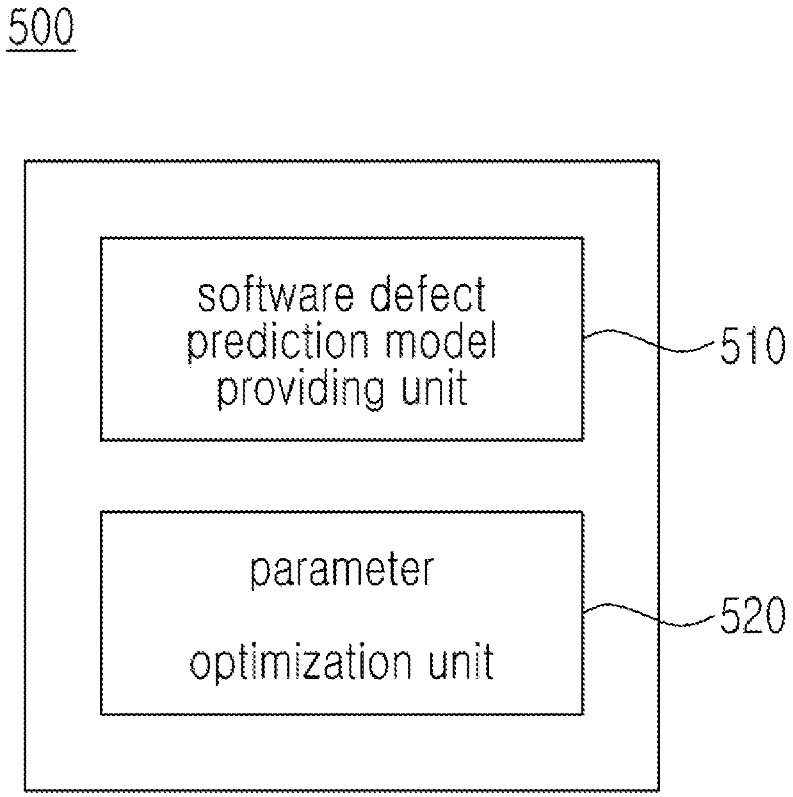
FIG. 5 is a diagram schematically illustrating a configuration of a performance enhancement device for a software defect prediction model, according to an embodiment of the present invention.

FIG. 5 is a diagram schematically illustrating a configuration of a performance enhancement device for a software defect prediction model, according to an embodiment of the present invention.

A performance enhancement device 500 for a software defect prediction model according to an embodiment of the present invention includes a software defect prediction model providing unit 510 including one or more computer processors and a parameter optimization unit 520 including one or more computer processors.

The software defect prediction model providing unit 510 provides a software defect prediction model that identifies a module in which a software defect may occur.

The parameter optimization unit 520 simultaneously optimizes at least one parameter in each step of a software defect prediction process by using an optimization algorithm to enhance the performance of the software defect prediction model. In an optimization procedure, a search space of the optimization algorithm simultaneously considers a preprocessing step and a classification model generation step.

In one embodiment, the optimization algorithm uses a cost-sensitive decision tree based on harmony search (HS-CSDT). The optimization algorithm refers to a computer operation technique that finds a solution for minimizing or maximizing a given cost function value by adjusting optimization variable values of various engineering problems within each search range.

In one embodiment, it is characterized in that the cost-sensitive decision tree based on harmony search is used a harmony search algorithm (HS) that is a metaheuristic algorithm.

In one embodiment, it is characterized in that the preprocessing step includes normalization, feature selection, and class imbalance learning, and the classification model generation step includes a decision tree (DT) model.

The parameter optimization unit 520 includes a parameter extraction unit 610 that extracts parameters in normalization, feature selection, and class imbalance learning and hyperparameters of a decision tree model by executing a the cost-sensitive decision tree based on harmony search with training data, and a performance evaluation unit 620 including one or more processors that evaluates the performance of a software defect prediction model by using the extracted parameters in the normalization, feature selection, and class imbalance learning and the extracted hyperparameters of the decision tree model.

It is characterized in that the performance evaluation of the software defect prediction model of the performance evaluation unit 620 is performed by calculating probability of detection, probability of false alarm, a G-measurement value (G-measure), and file inspection reduction (FIR) by using validation data and by calculating an average value by averaging the calculated results.

Figure 6:
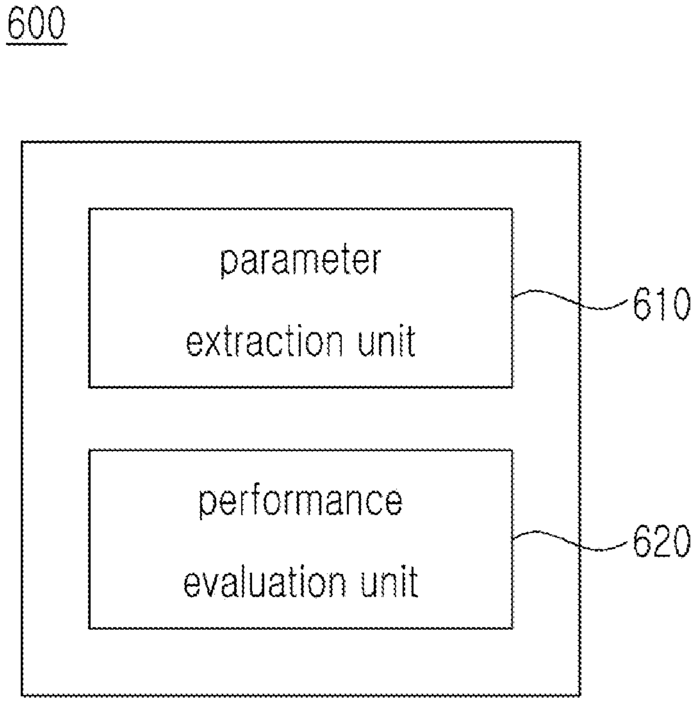
FIG. 6 is a diagram schematically illustrating a configuration of a parameter optimization unit according to an embodiment of the present invention.

FIG. 6 is a diagram schematically illustrating a configuration of a parameter optimization unit according to an embodiment of the present invention.

A parameter optimization unit 600 of the present invention includes the parameter extraction unit 610 and the performance evaluation unit 620.

The parameter extraction unit 610 extracts parameters in normalization, feature selection, and class imbalance learning and hyperparameters of a decision tree model by executing a cost-sensitive decision tree based on harmony search with training data.

The performance evaluation unit 620 evaluates the performance of a software defect prediction model by using the extracted parameters in the normalization, feature selection, and class imbalance learning and the extracted hyperparameters of the decision tree model.

The parameter optimization unit 600 includes adjustment of the parameters in the normalization, feature selection, and class imbalance learning and the hyperparameters of the decision tree model to increase a G-measurement value (G-measure).

FIG. 7 is a diagram summarizing a statistical analysis result between a cost-sensitive decision tree based on harmony search (HS-CSDT) algorithm and another comparison method in software defect prediction, according to an embodiment of the present invention.

Comparison of HSOCS-US-SVM 710 and SOGA-LR 720 shows performance higher than or equal to an average level. There are differences from the method proposed by the present invention in all evaluation indicators PD, PF, G-measure, and FIR. This shows that the cost-sensitive decision tree based on harmony search (HS-CSDT) algorithm of the present invention has statistically significant performance enhancement.

Compared to SOGA-DT 730 and COSTE-MLP 740, some indicators are lower than an average level, but the G-measurement value significantly exceeds the average level. Since the SOGA-DT 730 and the HS-CSDT of the present invention differ only in a search space, the search space proposed by the present invention is more effective in enhancing performance.

A performance difference between DT 750 and the HS-CSDT method of the present invention shows a large level of performance difference in the remaining evaluation indicators except PF.

Also, the HS-CSDT of the present invention shows a significant level of performance enhancement compared to the performances of LR 760 and SVM models 770.

Through the comparison results in FIG. 7, it can be seen that a metaheuristic algorithm is effective in terms of performance enhancement. In particular, the HS-CSDT of the present invention shows a large performance difference compared to the related work methods in G-measure. By considering that the data used in software defect prediction (SDP) suffers from a class imbalance problem, G-measure, which comprehensively considers probability of detection (PD) and probability of false alarm (PF), shows significant performance enhancement.

Figure 8:
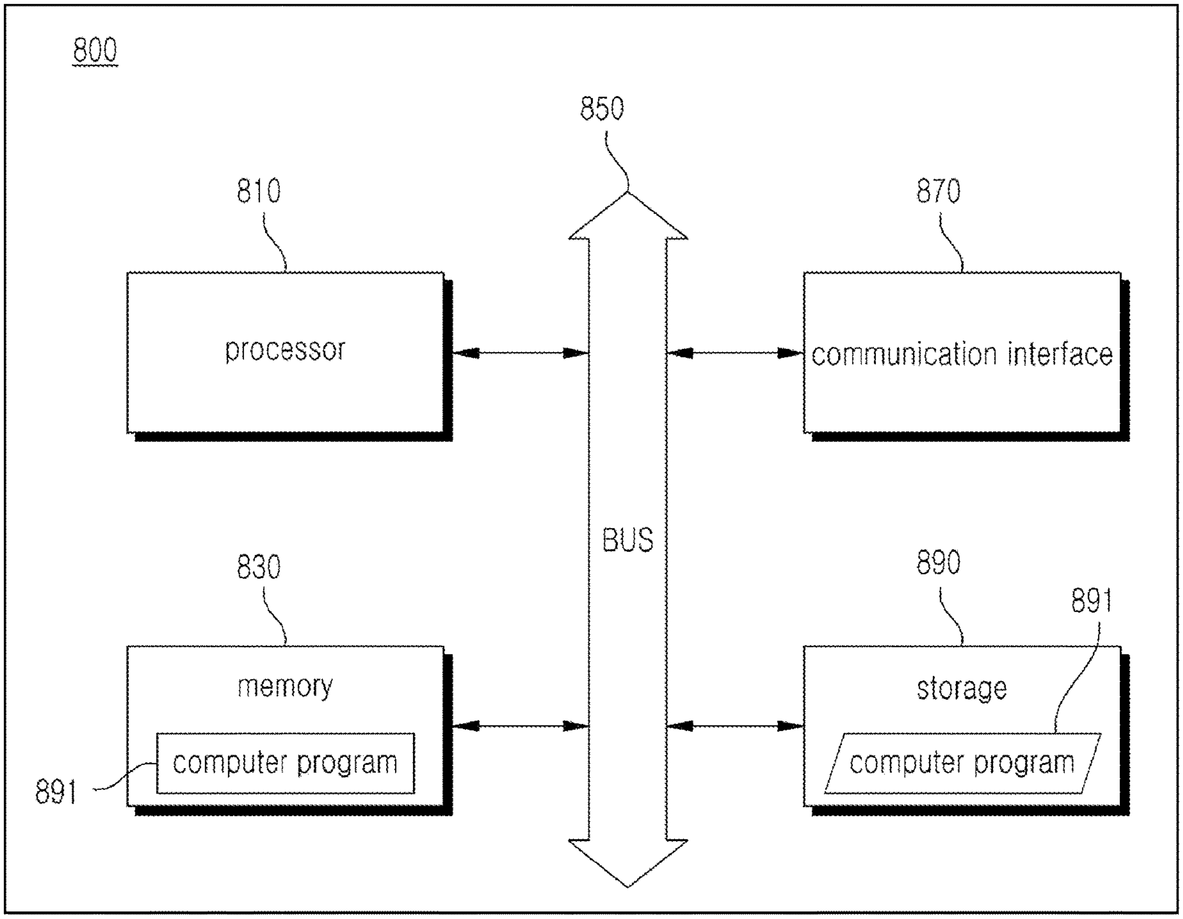
FIG. 8 is a diagram illustrating an example computing device that may implement a device and/or system according to various example embodiments of the present invention.

FIG. 8 is a diagram illustrating an example computing device that may implement a device and/or system according to various example embodiments of the present invention.

An example computing device 800 capable of implementing devices according to some embodiments of the present disclosure will be described in more detail with reference to FIG. 8.

The computing device 800 may include at least one processor 810, a bus 850, a communication interface 870, a memory 830 that loads a computer program 891 executed by the processor 810, and a storage 890 that stores the computer program 891. However, only components related to the embodiment of the present disclosure are illustrated in FIG. 8.

Accordingly, those skilled in the art to which the present disclosure pertains may recognize that other general-purpose components may be further included in addition to the components illustrated in FIG. 8.

The processor 810 controls all operations of respective components of the computing device 800. The processor 810 may be configured to include a central processing unit (CPU), a micro processor unit (MPU), a micro controller unit (MCU), a graphic processing unit (GPU), or any type of processor 810 well known in the art of the present disclosure. Also, the processor 810 may perform operations on at least one application or program for performing methods according to embodiments of the present disclosure. The computing device 800 may include at least one processor 810. The computing device 800 may refer to artificial intelligence (AI).

The memory 830 stores various types of data, various commands, and/or various types of information. The memory 830 may load at least one program 891 from the storage 890 to perform methods according to embodiments of the present disclosure. The memory 830 may be constituted by a volatile memory, such as RAM, but the technical scope of the present disclosure is not limited thereto.

The bus 850 provides communication functions between components of the computing device 800. The bus 850 may be constituted by various types of buses, such as an address bus, a data bus, and a control bus.

The communication interface 870 supports wired and wireless Internet communication of the computing device 800. Also, the communication interface 870 may support various communication methods other than Internet communication. To this end, the communication interface 870 may be configured to include a communication module well known in the technical field of the present disclosure.

According to some embodiments, the communication interface 870 may also be omitted.

The storage 890 may non-temporarily store at least one program 891 and various types of data.

The storage 890 may be configured to include a nonvolatile memory, such as ROM (read only memory), EPROM (erasable programmable ROM), EEPROM (electrically erasable programmable ROM), or flash memory, a hard disk, a removable disk, or any type of computer-readable recording medium well known in the art to which the present disclosure pertains.

The computer program 891 may include one or more commands that cause the processor 810 to perform methods/operations according to various embodiments of the present disclosure when loaded to the memory 830. That is, the processor 810 may perform methods/operations according to various embodiments of the present disclosure by executing the one or more commands.

Herein, preferred embodiments of the present invention are illustrated and described, but the present invention is not limited to the specific embodiments described above and may be modified and implemented in various ways by those skilled in the art without departing from the gist of the present invention claimed in the patent claims, and the modifications should not be understood individually from the technical idea or perspective of the present invention.

The invention claimed is:

1. A method, performed by one or more computer processors, for a software defect prediction model, comprising:

a software defect prediction model providing step of providing the software defect prediction model that identifies a module in which a software defect occurs; and a parameter adjustment step of adjusting at least one parameter in a software defect prediction process by using an adjustment algorithm, the method further comprising a preprocessing step and a classification model generation step, wherein the preprocessing step and the classification model generation step are simultaneously performed for a search space of the adjustment algorithm, wherein the adjustment algorithm uses a cost-sensitive decision tree based on harmony search (HS-CSDT), and the cost-sensitive decision tree uses a harmony search algorithm (HS) that is a metaheuristic algorithm, wherein the preprocessing step includes performing normalization, feature selection, and class imbalance learning, and the classification model generation step includes generating a decision tree (DT) model, wherein the parameter adjustment step includes:

a parameter extraction step of extracting parameters in the normalization, the feature selection, and the class imbalance learning, and extracting hyperparameters of the DT model by executing the cost-sensitive decision tree based on the harmony search with training data; and a performance evaluation step of evaluating performance of the software defect prediction model by using the extracted parameters in the normalization, the feature selection, and the class imbalance learning, and the extracted hyperparameters of the decision tree model.

2. The method for the software defect prediction model of claim 1, wherein the evaluation of the performance of the software defect prediction model is performed by calculating probability of detection, probability of false alarm, geometric mean (G-measure), and file inspection reduction (FIR), using validation data and by calculating an average value of the calculated probability of detection, probability of false alarm, G-measure and FIR.

3. The method for the software defect prediction model of claim 2, wherein the parameter adjustment step includes adjusting the parameters in the normalization, the feature selection, and the class imbalance learning and the hyperparameters of the DT model to increase the G-measure.

4. A device for a software defect prediction model, the device comprising:

at least one processor; and a memory storing instructions that, when executed by the at least one processor, cause the at least one processor to:

identify a module in which a software defect occurs; and adjust at least one parameter in a software defect prediction process by using an adjustment algorithm, wherein the at least one processor is configured to simultaneously perform a preprocessing step and a classification model generation step for a search space of the adjustment algorithm, wherein the adjustment algorithm uses a cost-sensitive decision tree based on harmony search (HS-CSDT) and the cost-sensitive decision tree uses a harmony search algorithm (HS) that is a metaheuristic algorithm, wherein the at least one processor is configured to perform normalization, feature selection, and class imbalance learning during the preprocessing step, and to generate a decision tree (DT) model during the classification model generation step, and wherein the at least one processor is further configured to:

extract parameters in the normalization, the feature selection, and the class imbalance learning and extract hyperparameters of the DT model by executing the cost-sensitive decision tree based on the harmony search with training data; and evaluate performance of the software defect prediction model by using the extracted parameters in the normalization, the feature selection, and the class imbalance learning, and the extracted hyperparameters of the DT model.

5. The device for the software defect prediction model of claim 4, wherein the evaluation of the performance of the software defect prediction model by the at least one processor is performed by calculating probability of detection, probability of false alarm, geometric mean (G-measure), and file inspection reduction (FIR), using validation data and by calculating an average value of the calculated probability of detection, probability of false alarm, G-measure, and FIR.

6. The device for the software defect prediction model of claim 5, wherein the at least one processor is configured to adjust the parameters in the normalization, the feature selection, and the class imbalance learning and the hyperparameters of the decision tree model to increase the G-measure.

* * * * *